March 24, 1931.  J. C. KARNES  1,797,867
OMNISCOPE
Filed Oct. 4, 1927
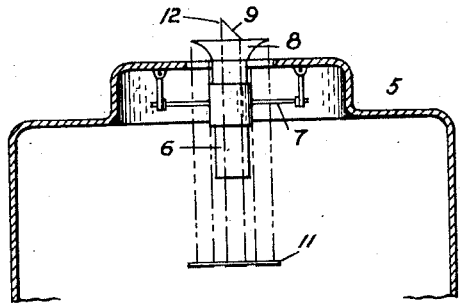
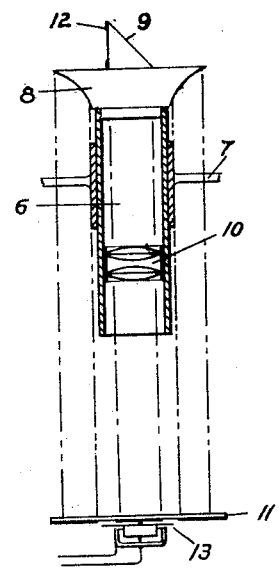
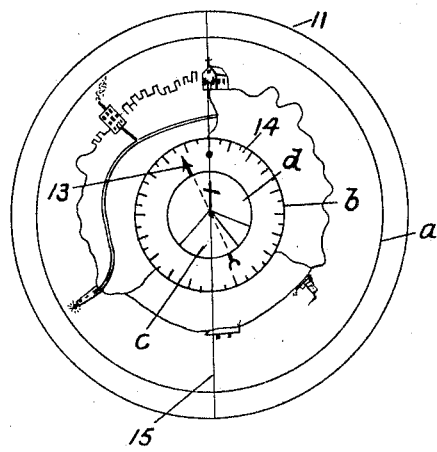
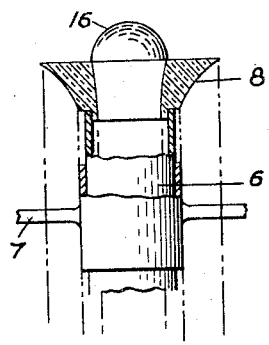
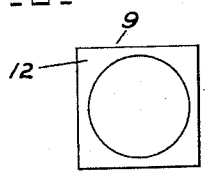
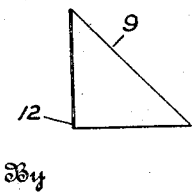
Inventor
J. C. Karnes
By W. N. Roach
Attorney Patented Mar. 24, 1931

1,797,867

UNITED STATES PATENT OFFICE

JAMES C. KARNES, OF BUFFALO, NEW YORK

OMNISCOPE

Application filed October 4, 1927. Serial No. 223,924.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is an omniscope.

Optical instruments designed for use in airplanes, submarines, military tanks and the like are generally of the periscopic type affording a panoramic view of the horizon.

With a view to facilitating and increasing observation I propose to associate with a paraboloidal reflector, an auxiliary reflector capable of introducing into that portion of the field not used by the paraboloidal reflector a repeat image or an additional image.

With the foregoing and other objects in view, my invention resides in the novel arrangement and combination of parts hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view of an inclosure illustrating the application of the omniscope;

Fig. 2 is a diagrammatic illustration of the preferred form of optical system;

Fig. 3 is a representation of the field which is presented to view;

Fig. 4 is a diagrammatic view of a modified form of reflector;

Figs. 5 and 6 are detail views in elevation of the right angle receiving prism.

Referring to Figs. 1 to 3 there is shown an inclosure 5 representing a conning tower of a tank or submarine or cockpit of an airplane. The optical system which is inclosed in any form of a suitable casing 6 may be pivotally suspended from the roof of the inclosure as by means of the bars 7 and the system comprises the external receiving prisms 8 and 9 and internal lenses 10—10 for directing the images corrected and magnified, on a flat plate or mirror 11.

The receiving prism 8 is in the form of a cylinder of revolution generated by a portion of a parabola and will present a panorama in the annular portion of the field lying between the circles $a$—$b$ of Fig. 3.

The receiving prism 9 shown in Fig. 5 which consists of an auxiliary reflector is a right angle prism centrally placed on the upper side of the paraboloid prism and directed to present a repeat image of that portion of the panorama directly in front of the inclosure. This image is received in the center of the field as shown at $d$ and is made to show in circular form by using a mask 12.

There remains an annular portion of the field between the circles $b$ and $c$ and this may be utilized to permit inclusion of a repeater 13 operated by a gyrocompass for the purpose of giving the magnetic bearing. Plate 11 is provided with a scale 14 and a reference line 15 so that the operator may follow a prescribed compass course.

Referring to Fig. 4 the auxiliary light directing body 16 substituted for the prism 9 is in the form of a hemispherical prism for introducing a celestial view into the field. This is of importance in detecting hostile overhead aircraft and in signal communication.

The purpose of the pivotal mounting 7 is to enable the observer to adjust the view when the tank, for example, is operating in a transversely inclined position or in difficult terrain.

I claim:

An optical system including a panoramic paraboloidal reflector, a prism mounted centrally above the reflector, an annular image receiving element in line with the reflector, a circular image receiving element positioned within and spaced from the annular element and in line with the prism and a compass repeater indicating in the space between the image receiving elements.

JAMES C. KARNES.